United States Patent
Kadotani et al.

(10) Patent No.: US 7,570,339 B2
(45) Date of Patent: Aug. 4, 2009

(54) LIQUID CRYSTAL DISPLAY DEVICE HAVING SPACER HOLES

(75) Inventors: Tsutomu Kadotani, Kanagawa (JP); Satoshi Inada, Kanagawa (JP); Takashi Kamino, Izumi (JP); Yusuke Nogami, Izumi (JP)

(73) Assignee: NEC LCD Technologies, Ltd. (JP)

( * ) Notice: Subject to any disclaimer, the term of this patent is extended or adjusted under 35 U.S.C. 154(b) by 163 days.

(21) Appl. No.: 11/109,960

(22) Filed: Apr. 20, 2005

(65) Prior Publication Data

US 2005/0237469 A1     Oct. 27, 2005

(30) Foreign Application Priority Data

Apr. 26, 2004    (JP) .............................. 2004-130072

(51) Int. Cl.
    *G02F 1/1339* (2006.01)
(52) U.S. Cl. ....................... 349/156; 349/155
(58) Field of Classification Search ................. 349/155, 349/156

See application file for complete search history.

(56) References Cited

U.S. PATENT DOCUMENTS

| | | | | |
|---|---|---|---|---|
| 6,067,144 A | * | 5/2000 | Murouchi | 349/156 |
| 6,304,308 B1 | * | 10/2001 | Saito et al. | 349/155 |
| 7,133,110 B2 | * | 11/2006 | Sasaki et al. | 349/156 |
| 7,286,204 B2 | * | 10/2007 | Yang et al. | 349/155 |

FOREIGN PATENT DOCUMENTS

| | | |
|---|---|---|
| JP | 2001-183637 | 7/2001 |
| JP | 2001-249328 | 9/2001 |
| JP | 2003-121859 | 4/2003 |
| JP | 2004-117694 | 4/2004 |
| KR | 2001-0062751 | 7/2001 |

* cited by examiner

*Primary Examiner*—David Nelms
*Assistant Examiner*—David Y Chung
(74) *Attorney, Agent, or Firm*—Hayes Soloway P.C.

(57) ABSTRACT

A liquid crystal display device includes an active matrix substrate and a counter substrate opposing each other with a gap therebetween defined by a plurality of columnar spacers. The active matrix substrate has a plurality of spacer holes each receiving therein a corresponding one of the columnar spacers, and a plurality of dummy spacer holes aligned with the spacer holes and each receiving therein no columnar spacer.

6 Claims, 10 Drawing Sheets

LIQUID CRYSTAL DISPLAY DEVICE HAVING SPACER HOLES

BACKGROUND OF THE INVENTION

1. Field of the Invention

The present invention relates to a liquid crystal display (LCD) device, and more particularly to a liquid crystal display device in which a pair of transparent substrates are opposed to one another via a plurality of columnar spacers.

2. Description of Related Art

LCD devices have advantages of a smaller thickness, lower power dissipation and a lower weight, and thus is increasingly used as flat-panel display devices. FIG. 9 shows a sectional view of a part of a conventional liquid crystal panel which configures an LCD device together with drive circuits etc. The liquid crystal panel 200 has a liquid crystal layer 202 sandwiched between a pair of transparent substrates 201 and 203. Generally, one of the pair of transparent substrates, for example, transparent substrate 201, is constructed as an array substrate having an array of switching elements, and the other, transparent substrate 203, is constructed as a counter substrate in which color filters, etc., are formed.

The array substrate 201 is designed based on the mode of driving the liquid crystal. For example, in an IPS (in-plane-switching) mode LCD device, a structure having an organic insulator film 205 provided between an interconnection layer and an electrode layer is adopted responding to the demand for increasing an aperture ratio of pixels. The term "aperture ratio" used herein is a ratio of an effective light-transmitting area in each pixel to the total pixel area thereof.

In an LCD device of a reflecting type, for example, in order to form unevenness on a reflecting film thereof, a structure is also provided in which the organic insulator film 205 is provided on the array substrate 201. In the liquid crystal panel 200, the array substrate 201 and the counter substrate 203 are opposed to each other with a predetermined cell gap therebetween defined by columnar spacers 204 each having a specific degree of elasticity, whereby the cell gap is maintained uniformly and accurately with the display area of the display panel.

FIG. 10 shows a top plan view of the liquid crystal panel 200. If the columnar spacers 204 are disposed for all the pixels in the liquid crystal panel 200, an accurate alignment is difficult to achieve in the operation for assembly of the array substrate 201 and the counter substrate 203, due to the excessive number of columnar spacers 204. In addition, the liquid crystal panel 200 may have an ununiform cell gap, after liquid crystal is injected between the pair of substrates 201 and 203. This is because the excessive number of columnar spacers makes it difficult to crush the columnar spacers between the substrates 201 and 203, although all the columnar spacers 204 should be crushed uniformly between the substrates. In order to avoid this problem in the liquid crystal panel 200, the columnar spacers 204 are disposed each for several pixels, as shown in FIG. 10.

Generally, in the liquid crystal panel 200, it is desired that the cell gap be formed smaller in order to accelerate the response speed upon the image display of the liquid crystal panel 200. However, in the liquid crystal panel 200, as the cell gap is narrowed, the height H1 of the columnar spacer 204 must be lower, whereby the amount of possible elastic deformation of each columnar spacer 204 is reduced, and hence gap unevenness occurs. Further, since the accuracy of the cell gap is mainly determined based on the accuracy of the height H1 of the columnar spacer 204 and the accuracy of the thickness of the organic layer 205, the error between a designed value of the cell gap and an actual cell gap is increased with the increase of these unevenness factors.

There is a technology described in Japanese Patent Laid-Open Publication No. 2003-121859 as a technique for solving the above-described problems. FIG. 11 shows a sectional view of the LCD device described in the patent publication. In this technology, the organic insulator layer 205 is removed at positions corresponding to the positions for forming the columnar spacers 204, and spacer holes 206 each for receiving the columnar spacer 204 are formed. The height H2 of each columnar spacer 204 is increased as compared with the cell gap, as a result of which the amount of elastic deformation of the columnar spacer 204 can be increased. This allows the LCD device to have a more uniform cell gap. In addition, since the accuracy of the cell gap is determined based on the accuracy of the height of the columnar spacer 204, the error between the designed value of the cell gap and the actual cell gap is reduced with the smaller unevenness factor.

It is to be noted that another organic film is formed as an alignment film on each of the array substrate 201 and the counter substrate 203. The alignment film is, as shown in FIG. 12, rubbed by a rubbing roller 207 which rotates at a high speed. In the rubbing treatment, the surface of the alignment film is rubbed to generate dust or fine particles of the alignment film. This dust is generally pushed toward the rear side of the rubbing roller 207 in the rubbing direction. The spacer holes 206 formed in the organic insulator film 205 for the columnar spacers may receive therein the dust of the alignment film.

FIG. 13 shows an enlarged view in the vicinity of one of the columnar spacers 204 in the liquid crystal panel 200a. In the assembled state of the liquid crystal panel 200a, the dust of the alignment film remains in the vicinity of the contact surface between the columnar spacer 204 and the array substrate 201a. If an external force is applied to the liquid crystal panel 200a in this state, the dust of the alignment film may exit the spacer hole 206 due to the impact of the external force so that the dust of the alignment film is scattered into the liquid crystal layer 202. The dust of the alignment film 208 thus scattered in the liquid crystal layer 202 disturbs, as shown in FIG. 14, the direction of the liquid crystal molecules aligned by the alignment film, thereby causing a malfunction in the image display of the liquid crystal panel 100a.

SUMMARY OF THE INVENTION

In view of the problems in the conventional technique, it is an object of the present invention to improve the LCD device in which the height of the columnar spacers having an elasticity is larger than the cell gap, and to prevent the malfunction due to the dust of the alignment film generated by the rubbing treatment from occurring in the image display of the liquid crystal panel in the LCD device.

The present invention provides a liquid crystal display (LCD) device including: an active matrix substrate mounting thereon a plurality of pixels each including a switching device, the active matrix substrate having an alignment film at a topmost surface thereof; a counter substrate opposing the active matrix substrate with a gap therebetween formed by a plurality of columnar spacers; and a liquid crystal layer sandwiched between the active matrix substrate and the counter substrate, the active matrix substrate having a plurality of spacer holes each receiving therein a corresponding one of the columnar spacers and a plurality of dummy spacer holes each having dimensions substantially same as dimensions of the spacer holes, each of the dummy spacer holes receiving therein no columnar spacer.

In accordance with the LCD device of the present invention, the amount of dust of the alignment film received in each of the spacer holes can be reduced. Therefore, even if an external force is applied to the columnar spacer, the amount of dust of the alignment film scattered from the spacer holes can be reduced, and thus occurrence of the malfunction caused by the scattered dust of the alignment film can be reduced. The columnar spacers and the spacer holes in the present invention may have any cross-sectional shape such as a square or polygon.

DETAILED DESCRIPTION OF THE PREFERRED EMBODIMENTS

Figure 1:
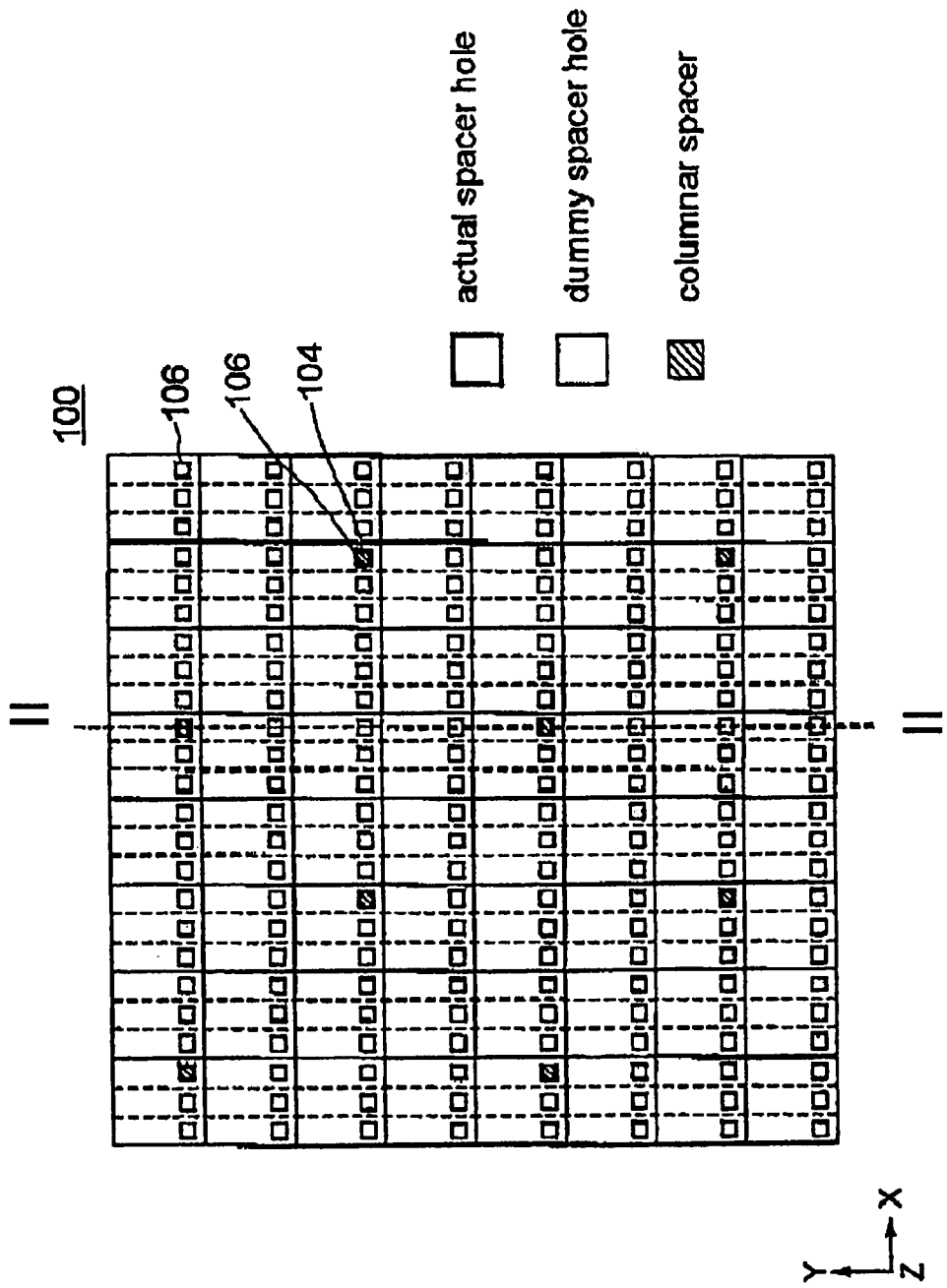
FIG. 1 is a top plan view showing a liquid crystal panel in an LCD device according to an embodiment of the present invention.
Figure 2:
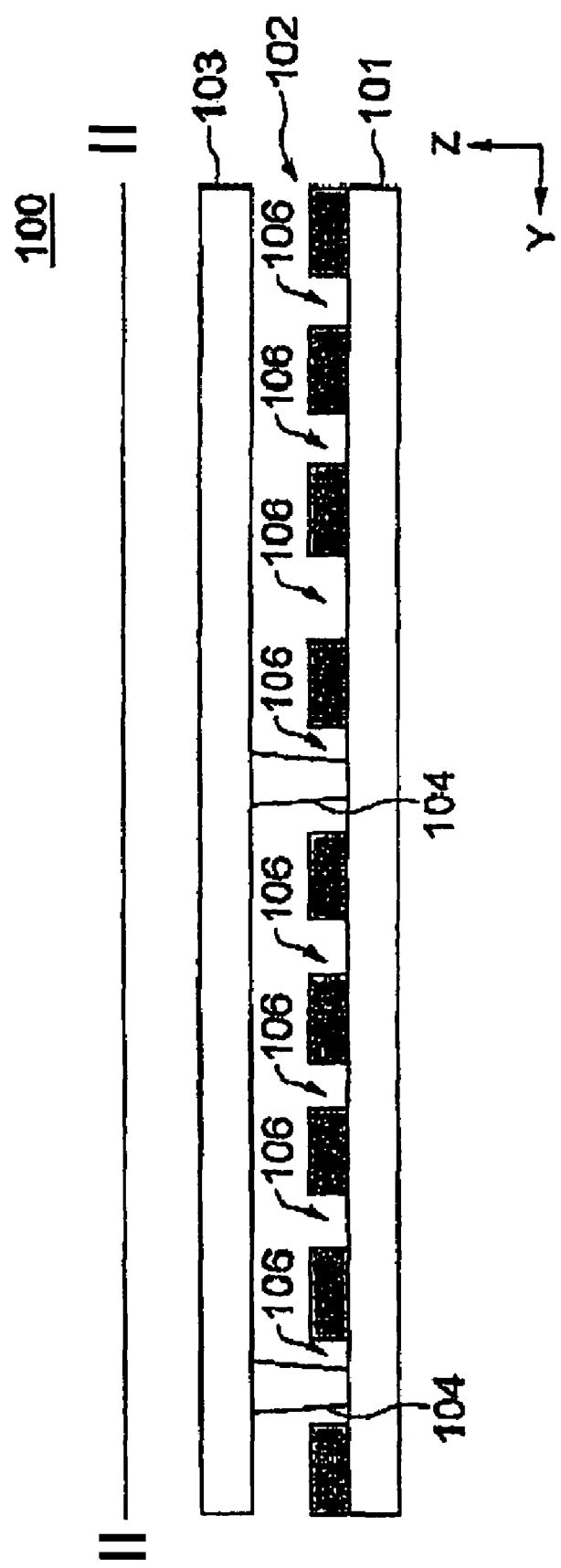
FIG. 2 is a sectional view taken along line II-II in FIG. 1.

Now, the present invention will be described in more detail based on a preferred embodiment of the present invention with reference to the accompanying drawings. FIG. 1 is a top plan view showing a liquid crystal panel in an LCD device according to an embodiment of the present invention. FIG. 2 shows a sectional view taken along line II-II in FIG. 1. The LCD device includes a liquid crystal panel 100, a backlight unit (not shown), and driver substrates (not shown), etc. As shown in FIG. 2, the liquid crystal panel 100 includes an array substrate 101, a liquid crystal layer 102, a counter substrate 103, and columnar spacers 104. The array substrate 101 has thereon an organic insulator film 105, which has therein a plurality of spacer holes 106.

Assembly of the liquid crystal panel 100 is conducted as follows. A sealing member is formed to surround the periphery of the array substrate 101 or the counter substrate 103 before the array substrate 101 and the counter substrate 103 are assembled together. The array substrate 101 and the counter substrate 103 are opposed to each other, with a predetermined cell gap therebetween determined by the columnar spacers 104. Thereafter, a liquid crystal is injected by using a one-drop fill (ODF) method, etc., to form the liquid crystal layer 102, and an injection inlet is blocked. The peripheries of the array substrate 101 and the counter substrate 103 are cut off at suitable positions, and polarizing plates (not shown) are respectively adhered onto the front and rear surfaces of the liquid crystal panel 100.

In FIG. 1, rectangular shapes each partitioned by adjacent broken lines or solid lines correspond to one pixel (monochromatic pixel). Normally, in a color liquid crystal panel, one colored pixel is composed of three monochromatic pixels. The columnar spacers 104 are dispersed and disposed in an X-Y plane of the liquid crystal panel 100, and one columnar spacer 104 is disposed for a plurality of "pixels", each of which means a monochromatic pixel as in the following description so long as it is referred to merely as pixel. The columnar spacers 104 are disposed so that the ratio of the total area of the contact surfaces between the columnar spacers 104 and the array substrate 101 to the entire area of the liquid crystal panel 100 in the X-Y plane assumes 1:1000.

The spacer hole 106 is formed by removing portions of the organic insulator film 105 (FIG. 2) of the array substrate 101. All the spacer holes 106 are designed to have the same shape and the same dimensions and to locate at the positions which correspond to the positions of the columnar spacers relative to the respective pixels. In the array substrate 101, the spacer holes 106 include real or actual spacer holes and dummy spacer holes. The actual spacer holes 106 receives therein the respective columnar spacers 104, whereas the dummy spacer holes 106 receive therein no columnar spacers.

Figure 3:
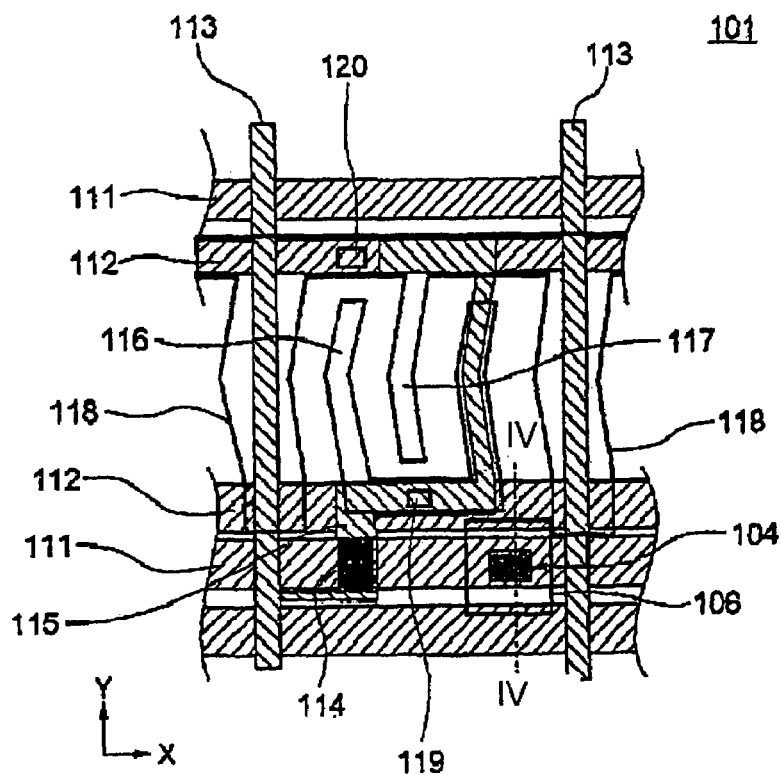
FIG. 3 is an enlarged top plan view showing a pixel including therein a columnar spacer 104.

FIG. 3 shows an enlarged view of one of the pixels for which a columnar spacer 104 is formed. In an example shown in FIG. 3, the liquid crystal panel 100 is constructed as a panel which operates in an IPS mode. In the array substrate 101, each pixel is disposed in the vicinity of one of the intersections between gate lines 111 (or common lines 112) extending along the X-direction and signal lines 113 extending along the Y-direction. In the liquid crystal panel 100, the pixels other than the pixel for which the columnar spacer 104 is formed have a structure similar to the structure of the pixel shown in FIG. 3, except that the columnar spacers 104 are not disposed in the dummy spacer holes.

As shown in FIG. 3, each pixel includes a thin film transistor 114, an intra-pixel line 115, a pixel electrode 116, a common electrode 117, and a shield common electrode 118. The pixel electrode 116 is connected to the intra-pixel line 115 via a contact hole 119, and the common electrode 117 and the shield common electrode 118 are connected to the common line 112 via a contact hole 120. The columnar spacer 104 and the spacer hole 106 are formed such that the sectional shapes thereof taken along the plane parallel to the X-Y plane are, for example, square. The region partitioned by adjacent common lines 112 and adjacent signal lines 113 configures an effective light-transmitting region within the pixel.

Figure 4:
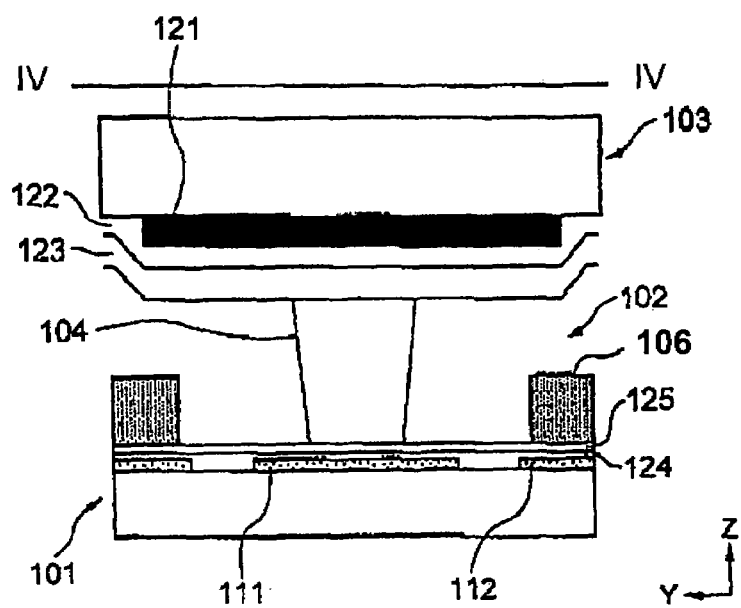
FIG. 4 is a sectional view taken along line IV-IV in FIG. 3.

FIG. 4 shows a sectional view taken along line IV-IV in FIG. 3. The counter substrate 103 has thereon a black matrix 121, a color layer 122, and an overcoat layer 123, which are layered one on another in this order. The color layer 122 has any of three primary colors of light such as RGB. The black matrix 121 has a light-shielding property, and partitions the effective light-transmitting region. The columnar spacer 104 and the spacer hole 106 are formed on the gate line 111 outside the effective light-transmitting region of the pixel. In FIG. 4, the width of a portion that the columnar spacer 104 is contacted with the array substrate 101 is, for example, 12 μm, and the width of the spacer hole 106 is, for example, about 25 to 30 μm.

The array substrate 101 is obtained by a fabrication process as is described below. First, the gate lines 111 and the common lines 112 are formed on a glass substrate, a gate insulating film 124 is formed, and an a-Si layer necessary to form the TFT 114 is formed. Thereafter, the signal lines 113 and the intra-pixel line 115 are formed, followed by forming an inorganic protective film 125. Subsequently, the organic insulator film 105 is formed, and a part of the organic insulator film 105 is removed to form the contact holes 119 and 120 and the spacer holes 106. The spacer holes 106 are formed for both the pixels for which the columnar spacers 104 are formed and the pixels for which the columnar spacers 104 are not formed. The pixel electrode 116, the common electrode 117 and the shield common electrode 118 are formed on the organic insulator film 105 from an ITO film. In this example, the shield common electrode 118 is formed on the organic insulator film 105, and thus the signal lines 113 and the shield common electrode 118 are disposed to overlap with one another. This structure allows a larger effective light-transmitting area for each pixel.

Figure 5:
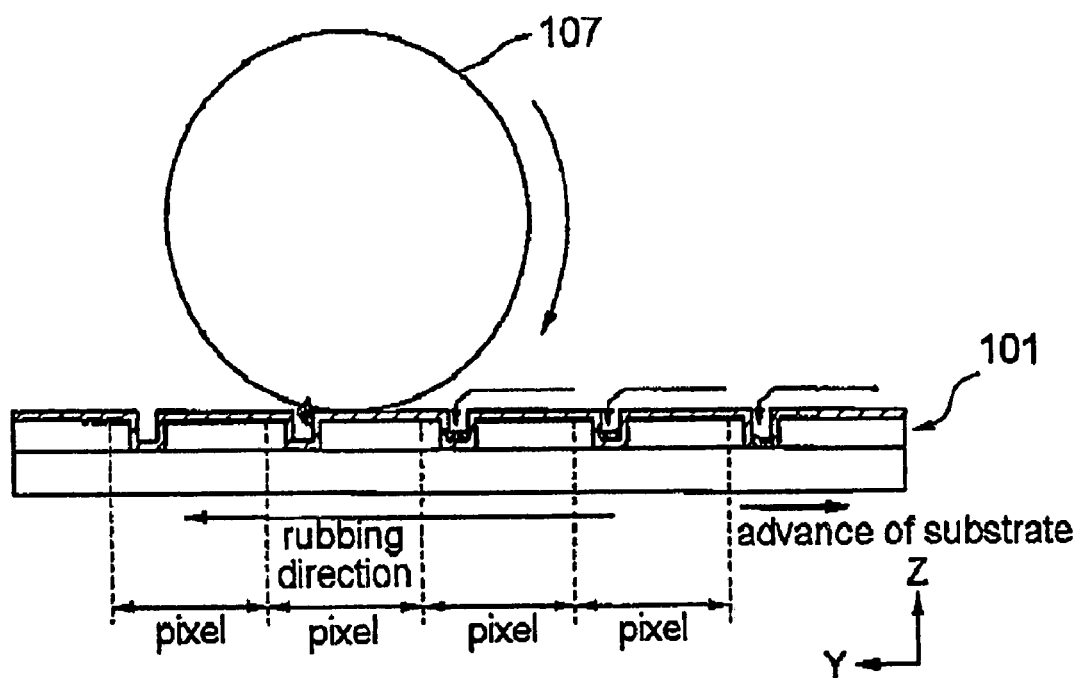
FIG. 5 is a sectional view showing the rubbing treatment for the array substrate.

FIG. 5 shows the state of the rubbing treatment for the array substrate. An organic film is formed as an alignment film on the array substrate 101, and the alignment film is subjected to the rubbing treatment for initially orienting the liquid crystal molecules in the liquid crystal layer in a predetermined direction. The rubbing treatment is conducted by the rubbing roller 107 rotating at a high speed. In this example, the array substrate 101 is moved in the Y-direction, and thus the alignment film is rubbed in the Y-direction. In the rubbing treatment, the surface of the alignment film is rubbed to generate dust of the alignment film. The dust of the alignment film is driven mainly toward the rear side of the rubbing roller 107, and then received in the spacer holes 106.

Figure 12:
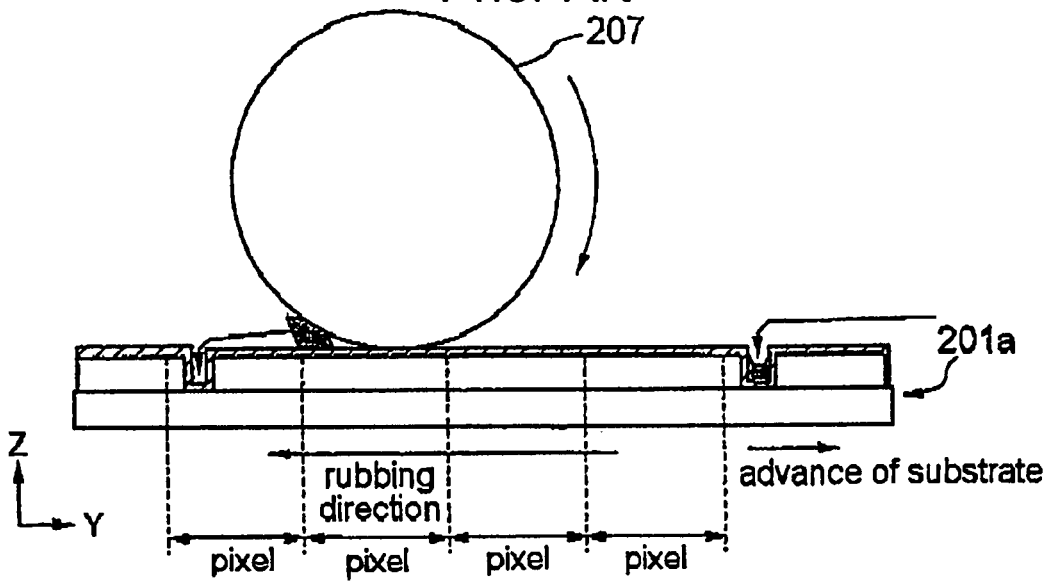
FIG. 12 is a sectional view showing the rubbing treatment in manufacture of a conventional array substrate.
Figure 13:
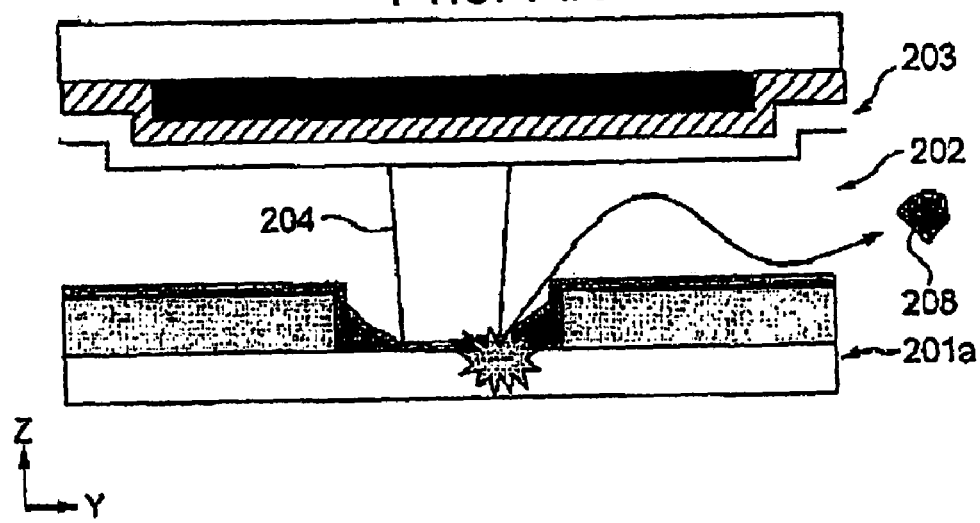
FIG. 13 is an enlarged sectional view showing the vicinity of a columnar spacer in a conventional liquid crystal panel.

In the conventional array substrate 201a shown in FIG. 12, since the spacer holes 206 are formed only in the pixel provided with the columnar spacers 204, the dust of the alignment film generated in the area of four pixels disposed between adjacent two spacer holes 206 in the rubbing direction was received in one of the spacer holes 206 disposed on the rear side of the rubbing roller. In comparison of FIG. 5 with FIG. 12, the number of the spacer holes 106 aligned in the rubbing direction in the present embodiment is four times as many as the number of the spacer holes 206 aligned in the rubbing direction in the conventional array substrate 201a. Therefore, the amount of dust of the alignment film to be received in one spacer hole 106 corresponds to the amount of dust of the alignment film generated in the area of one pixel, whereby the amount of dust received in each spacer hole is ¼ times as much as the amount of dust of the alignment film received in each spacer hole in the conventional array substrate 201a.

Here, the contact holes 119 and 120 are also formed in the organic insulator film 105. Generally, the contact hole is formed to have a width of about 7 to 8 μm, and opening area of the contact holes 119 and 120 is considerably smaller as compared to the opening area of the spacer hole 106. Therefore, it is considered that the amount of dust of the alignment film received in the contact holes 119 and 120 is negligible as compared to the amount of dust received in the spacer holes 16.

In the present embodiment, since the spacer holes 106 having sufficient volumes for receiving the columnar spacers 104 are formed in all the pixels irrespective of whether or not the pixels receive therein the columnar spacers 104, the amount of dust of the alignment film received in each spacer hole 106 in the present embodiment is reduced compared to the case where only the actual spacer holes are formed corresponding to the columnar spacers as in the conventional technique.

Figure 14:
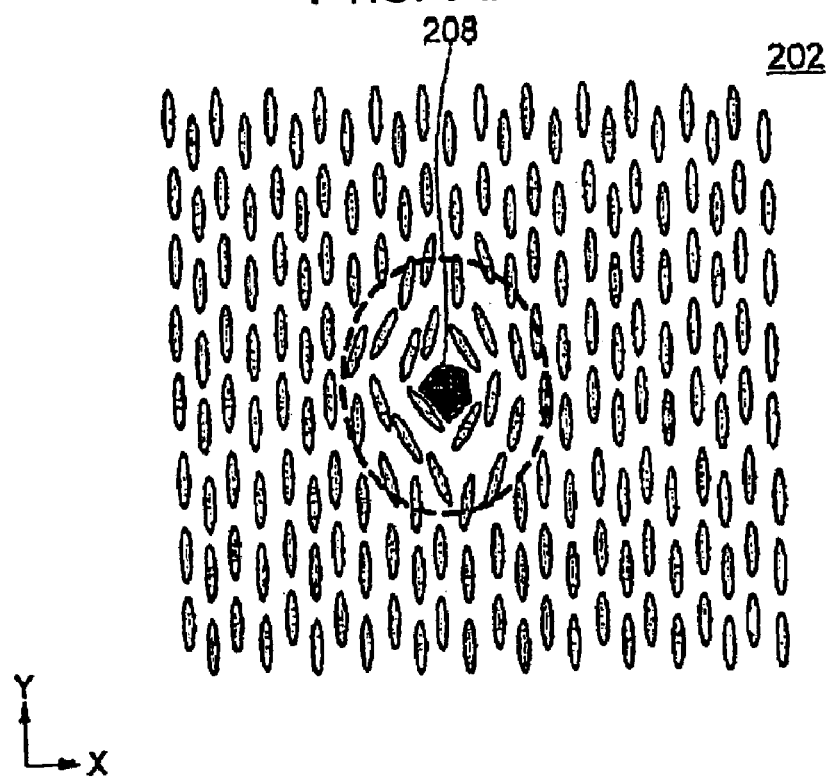
FIG. 14 is a top plan view showing a malfunction in image display caused by dust of the alignment film in a liquid crystal layer.

Even in the liquid crystal panel 100 of the present embodiment, similarly to that shown in FIG. 14, the dust of the alignment film is stored in the vicinities of the contact surfaces between the columnar spacers 104 and the array substrate 101 in the assembled state. However, as described above in the present embodiment, the amount of dust of the alignment film stored in one spacer hole 106 is significantly smaller as compared to the dust of the alignment film stored in the spacer hole 206 in the conventional liquid crystal panel 200a. Therefore, the amount of dust of the alignment film scattered in the liquid crystal layer 102 by the impact of an external force applied to the liquid crystal panel 100 is less than the amount of dust of the alignment film scattered in the liquid crystal layer 202 in the conventional liquid crystal panel 200a. Thus, in the liquid crystal panel 100 of the present embodiment wherein the height of the columnar spacer 104 is higher than the cell gap, generation of the gap unevenness is suppressed, and occurring of a malfunction in image display can be reduced while reducing the unevenness of the cell gap.

Figure 6:
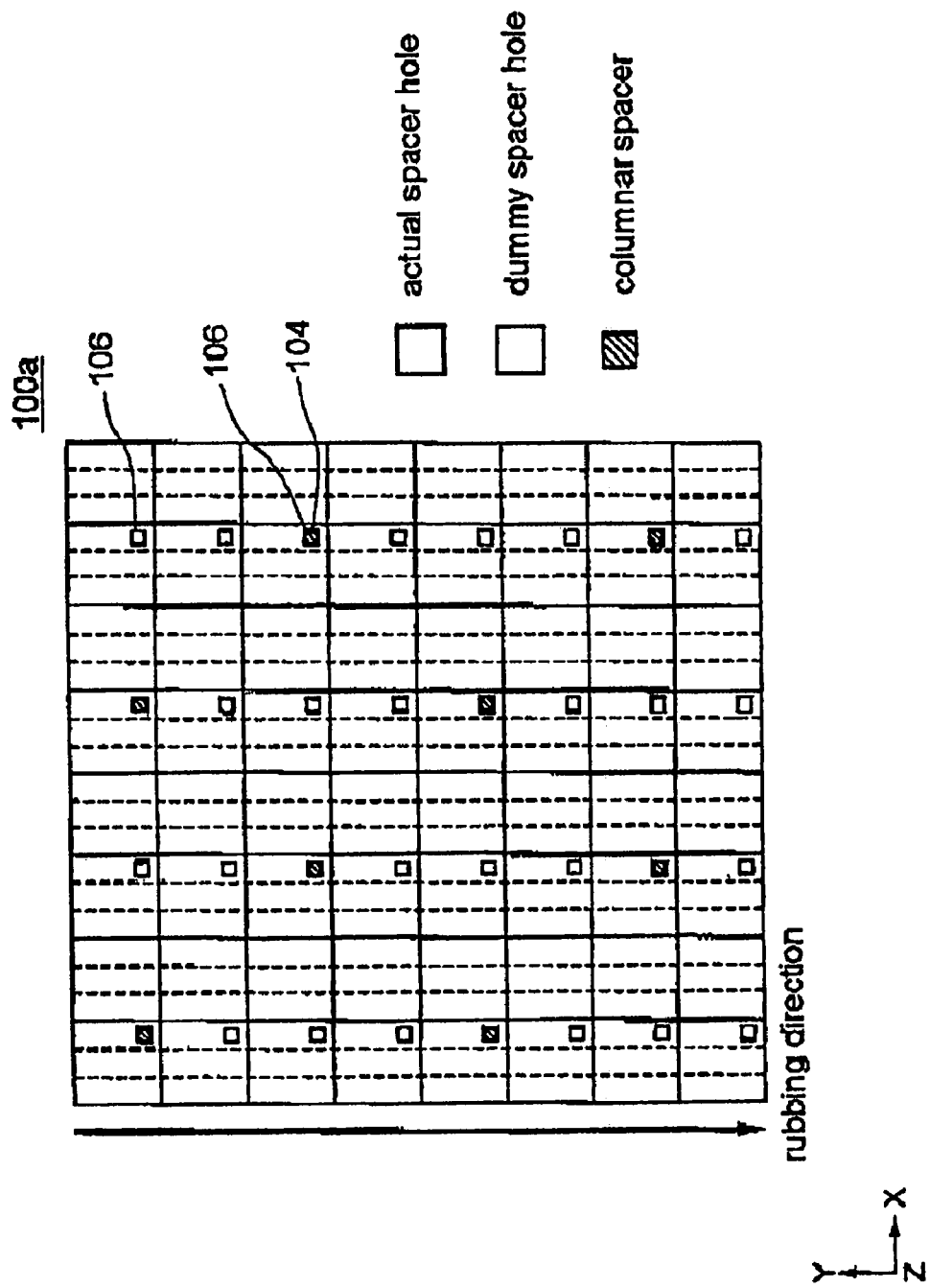
FIG. 6 is a top plan view showing a liquid crystal panel modified from the liquid crystal panel in the above embodiment.

In the above embodiment, an example is shown wherein the spacer holes 106 are formed in all the pixels; however, it is not necessary to form the spacer holes 106 in all the pixels. For example, if the rubbing treatment is conducted along the Y-direction, as shown in FIG. 6 depicting a modification from the above embodiment, the spacer holes 106 may be formed only in the row of pixels arranged in the Y-direction and including pixels provided with the columnar spacers. Also in this case, the dust of the alignment film received in one spacer hole 106 is reduced by increasing the number of the spacer holes 106 aligned in the rubbing direction as in the example shown in the above embodiment. It is to be noted here that arrangement of the dummy spacer holes is not to receive the dust of the alignment film, and in fact the dummy spacer holes are formed in order to reduce the amount of the dust to be received in any of the holes formed on the surface of the array substrate. The dust generally advances along the rubbing direction during the rubbing operation, and this is the reason why the dummy spacer holes are aligned with the actual spacer holes in the rubbing direction. If the dust of the alignment film is not received in the spacer holes during the rubbing treatment, it does not cause any malfunction in the image display of the LCD device.

Figure 7:
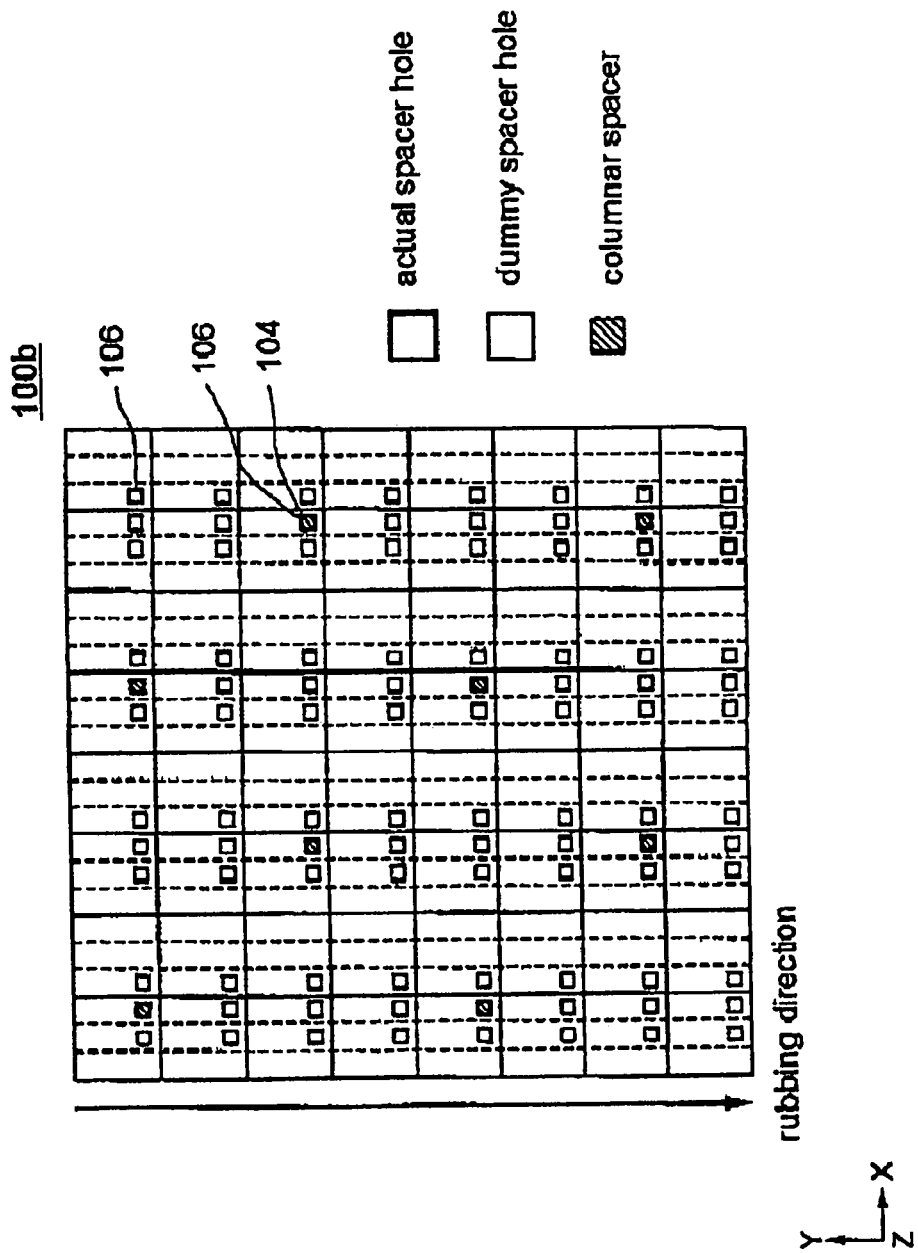
FIG. 7 is a top plan view showing another liquid crystal panel modified from the liquid crystal panel in the above embodiment.

FIG. 7 shows a further modification from the modification of FIG 6. In FIG. 7, in addition to a first row of pixels including the pixels provided with the columnar spacers 104 and the pixels aligned with these pixels in the Y-direction, second and third rows of pixels adjacent to the first row of pixels in the X-direction are also provided with dummy spacer holes. In this case, the amount of dust of the alignment film received in each spacer hole 106 can be decreased by increasing the number of spacer holes for receiving the dust of the alignment film.

Figure 8:
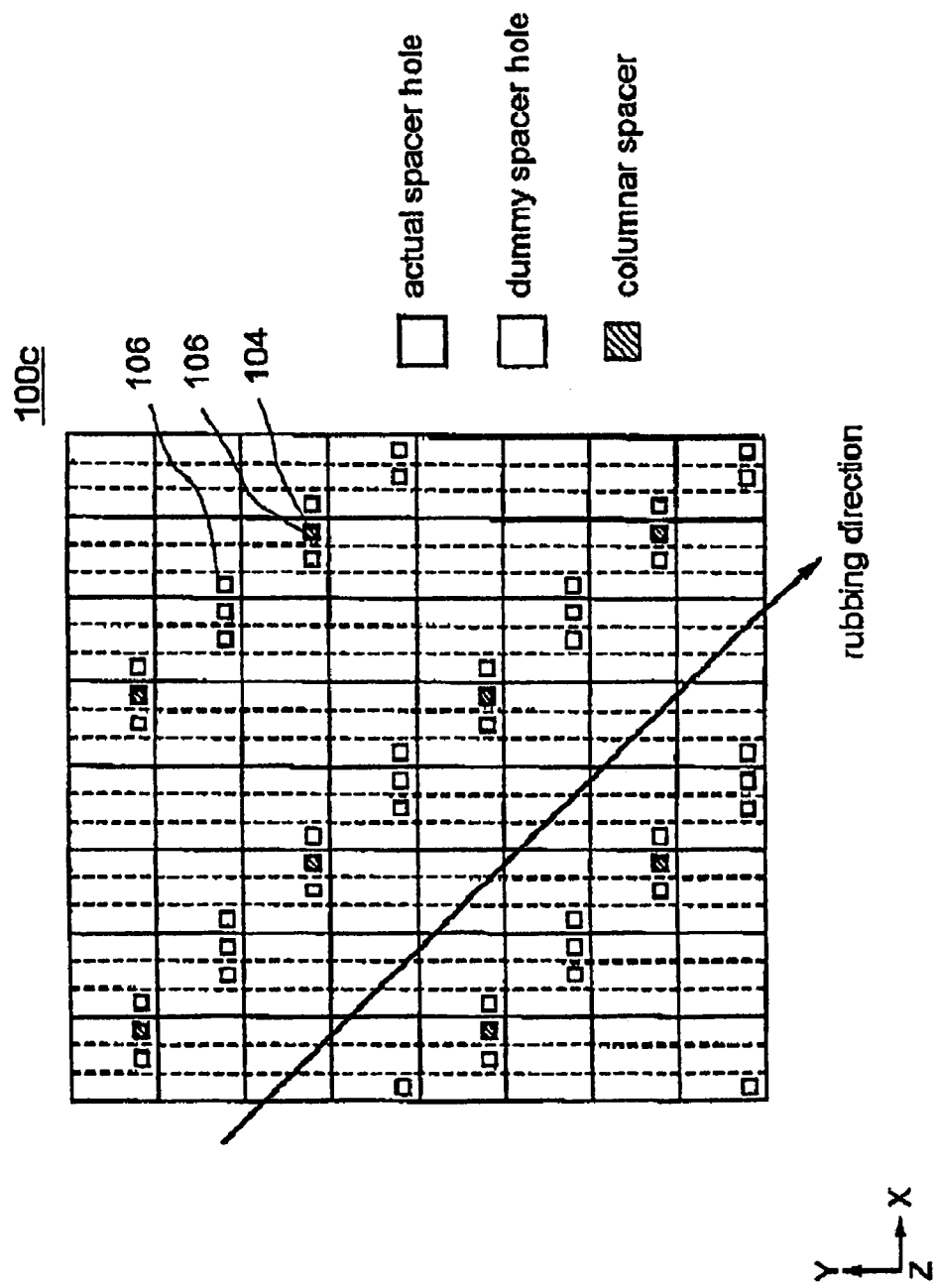
FIG. 8 is a top plan view showing another liquid crystal panel modified from the above embodiment.
Figure 9:
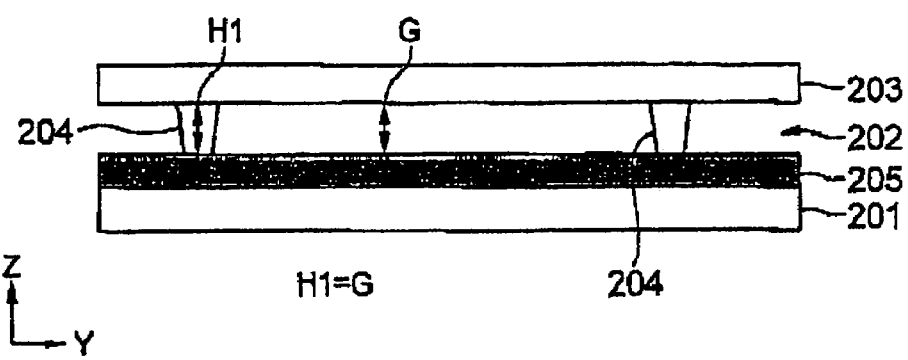
FIG. 9 is a sectional view showing a part of a conventional liquid crystal panel in an LCD device.
Figure 10:
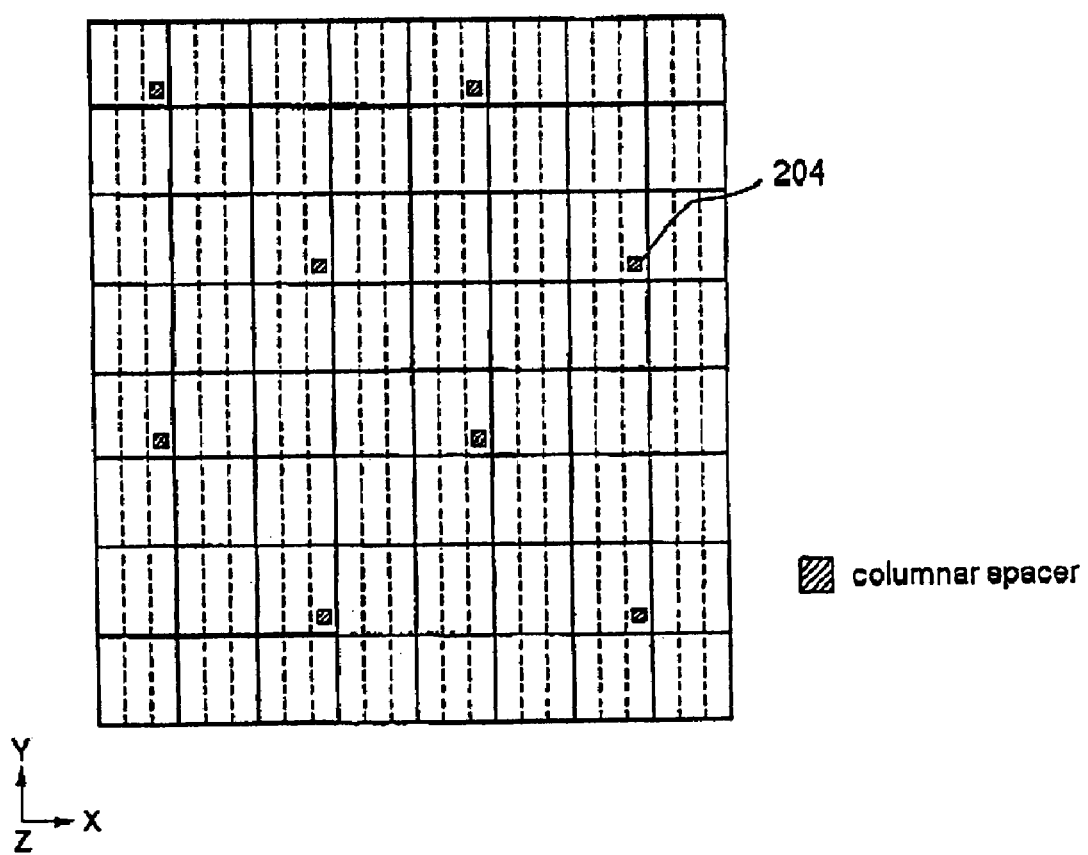
FIG. 10 is a top plan view showing the arrangement of the columnar spacers in the conventional liquid crystal panel.
Figure 11:
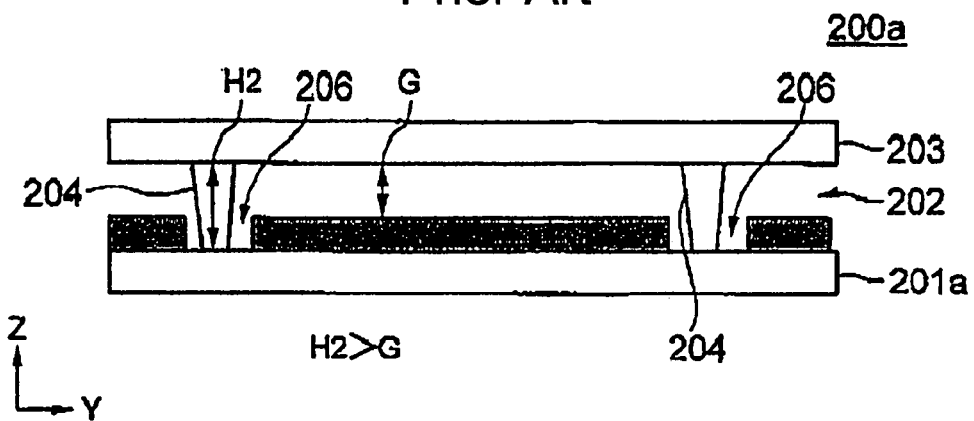
FIG. 11 is a sectional view showing a conventional LCD device described in a patent publication.

If the rubbing treatment is to be conducted in the direction oblique to the X-direction or the Y-direction, the structure shown in FIG. 8 may be employed. As shown in FIG. 8, the spacer holes 106 may be formed in some rows of pixels aligned with the rubbing direction.

In the above embodiment and modifications, examples are shown wherein the spacer holes 106 are formed in all the pixels or the rows of pixels aligned in the direction parallel to the rubbing direction. However, the spacer holes need not be aligned exactly in the direction parallel to the rubbing direction, or need not be formed in all the pixels of a row including the pixels provided with the columnar spacers. For example, some of the pixels of a row including the pixels provided with the columnar spacers may be provided with the dummy spacer holes. Also, the LCD device of the present invention may be an LCD device adopting a display mode other than the ISP mode.

Since the above embodiment and modifications are described only for examples, the present invention is not limited to the above embodiments and various other modifications or alterations can be easily made therefrom by those skilled in the art without departing from the scope of the present invention.

What is claimed is:

1. A liquid crystal display (LCD) device comprising: an active matrix substrate mounting thereon a plurality of pixels each including a switching device, said active matrix substrate having an alignment film at a topmost surface thereof; a counter substrate opposing said active matrix substrate with a gap therebetween defined by a plurality of columnar spacers; and a liquid crystal layer sandwiched between said active matrix substrate and said counter substrate, said active matrix substrate having a plurality of active spacer holes and a plurality of dummy spacer holes each having dimensions substantially the same as the dimensions of said active spacer holes, wherein the dummy spacer holes and the active spacer holes are formed in the same layer, wherein some of said dummy spacer holes are aligned with some of said active spacer holes in a rubbing direction of said alignment film, and wherein the plurality of active spacer holes and the plurality of dummy spacer holes together exceed in number the plurality of columnar spacers, and said columnar spacers are located and received only in the active spacer holes.

2. The LCD device according to claim 1, wherein said active matrix substrate having thereon an organic insulator film covered with said first alignment film, and wherein said active spacer holes and said dummy spacer holes are formed by removing portions of said organic insulator film.

3. The LCD device according to claim 1, wherein each of said active spacer holes and said dummy spacer holes is disposed in a corresponding one of said pixels outside an effective light-transmitting area thereof.

4. The LCD device according to claim 1, wherein a row of said pixels includes first pixels each provided with a corresponding one of said active spacer holes and second pixels each provided with a corresponding one of said dummy spacer holes.

5. The LCD device according to claim 1, wherein said LCD device operates in an in-plane-switching mode.

6. The LCD device according to claim 1, wherein all said columnar spacers are located and received in the active spacer holes.

* * * * *